United States Patent Office 2,910,475
Patented Oct. 27, 1959

2,910,475

PROCESS FOR PREPARING BENZOTHIADIAZINE-1,1-DIOXIDES

Frederick C. Novello, Lansdale, Pa., assignor to Merck & Co., Inc., Rahway, N.J., a corporation of New Jersey No Drawing. Application September 13, 1957
Serial No. 683,694

4 Claims. (Cl. 260—243)

This invention is concerned with a novel process for introducing a sulfamyl substituent into the benzenoid portion of a benzothiadiazine-1,1-dioxide compound.

It has been found that when a benzothiadiazine-1,1-dioxide compound and chlorosulfonic acid are heated together it is possible to introduce a sulfonyl chloride group into the 7-position of the benzothiadiazine nucleus. The sulfonyl chloride group then can be treated with ammonia or a primary or secondary amine to form the desired 7-sulfamyl-benzothiadiazine-1,1-dioxide compound.

The novel process of this invention is preferably carried out by employing an excess of a molar equivalent of chlorosulfonic acid and by heating the reaction mixture at a temperature between about 100–165° C. The sulfonyl chloride thus prepared then is reacted with ammonia or a primary or secondary amine to form the desired 7-sulfamyl derivative. The ammonia or the amine is employed in excess of that required to convert the sulfonyl chloride group to the sulfamyl group and preferably at least two molar equivalents of ammonia or the amine is used. Ammonia can be added in the form of aqueous or alcoholic ammonium hydroxide, liquid ammonia, or by dissolving the sulfonyl chloride in an organic solvent and bubbling ammonia gas into the solution to form the sulfamyl derivative. If an amine is employed to form the substituted sulfamyl group, this reactant preferably is a mono-lower alkylamine, a di-lower alkylamine, or the nitrogen atom of the amine can be part of a heterocyclic system as in the piperidine, pyrrolidine or morpholine compounds.

The novel sulfamylbenzothiadiazine-1,1-dioxide compounds prepared by the process of this invention are the subject of my copending United States patent application, Serial No. 582,082, filed by myself May 2, 1956, now Patent No. 2,809,194, of which the instant application is a continuation-in-part. The sulfamylbenzothiadiazine-1,1-dioxide compounds prepared by the process of this invention have one of the structural formulae illustrated below. In those compounds having no substitution other than hydrogen on either nitrogen in the 2- or 4-position of the benzothiadiazine-1,1-dioxide nucleus, the molecules possess a tautomeric system in which an alpha, gamma proton shift gives tautomers which have the double bond located either between the 2- and 3-position atoms or between the atoms in the 3- and 4-position. In those compounds having a substituent on the nitrogen atom in the 2-position, the double bond exists between positions 3 and 4, and when substitution occurs on the $N^4$ atom, the double bond exists between positions 2 and 3. Thus, in general, the compounds can be considered having one of the general structures:

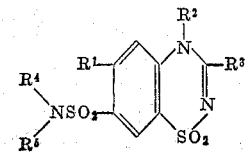

and

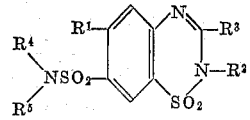

or these structures can be tautomeric isomers, wherein $R^1$ is hydrogen, halogen for example chlorine, bromine, fluorine, and the like, lower alkyl advantageously containing from 1 to 5 carbon atoms, lower alkoxy preferably having from 1 to 5 carbon atoms in the alkyl portion of the radical, or a nitro or an amino group; $R^2$ can be hydrogen or a lower alkyl radical advantageously having from 1 to 5 carbon atoms; $R^3$ is hydrogen or a lower alkyl radical having advantageously from 1 to 11 carbon atoms; and

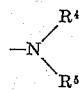

is the amino radical, a mono-lower alkylamino, or a di-lower alkylamino radical, piperidyl, pyrrolidyl, or a morpholinyl radical.

The above compounds which are prepared by the novel methods of this invention are useful pharmacotherapeutic agents principally because of their diuretic and/or natriuretic properties. The compounds are effective upon oral administration in the form of tablets or capsules and the like as well as by injection when dissolved in a dilute alkaline medium or in polyethylene glycol.

While some of the benzothiadiazine-1,1-dioxide starting materials employed in the process of this invention are known compounds, some of them, which are not known, can be prepared from o-sulfamylanilines by the method described in my copending patent application, Serial No. 582,082. In general the method provides that the o-sulfamylaniline be heated with formic acid or ethyl orthoformate at between about 100–150° C., after which the solvent is removed preferably by distillation to form the desired benzothiadiazine-1,1-dioxide starting material.

When o-sulfamylaniline itself is not a known compound, it, in turn, can be prepared by one of several methods. One method employs known 2-aminobenzenesulfonic acids which are heated under reflux with thionyl chloride to form the corresponding anilinesulfonyl chloride. This compound then is reacted with ammonia or an amine to form the desired o-sulfamylaniline and converted to the benzothiadiazine-1,1-dioxide by the methods described above.

Another method by which the sulfamylaniline compounds can be prepared, and which method is novel and forms another feature of this invention, employs the appropriate 2-chloronitrobenzene as the starting material. The selected 2-chloronitrobenzene is converted to the desired sulfamylaniline by the series of reactions illustrated below:

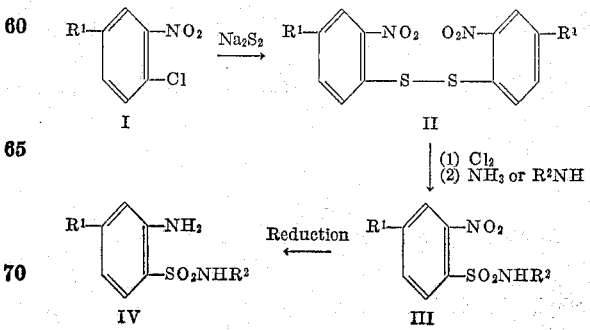

The above reaction is carried out by preparing a solution of sodium disulfide in alcohol to which is added a solution in alcohol of the selected 2-chloronitrobenzene. These reactants are preferably employed in the ratio of 2 molar equivalents of the 2-chloronitrobenzene to at least a mole of sodium disulfide, although more sodium disulfide can be employed if desired. The disulfide advantageously is added dropwise over a period of 1 to 2 hours as the reaction is vigorous and exothermic, and the mixture then is heated between 50–100° C., preferably in the steam bath for an additional 1 to 3 hours to form the di-(2-nitrophenyl) disulfide (II). The disulfide compound then is treated with chlorine in a medium made strongly acidic with acetic acid or with a mixture of concentrated hydrochloric and nitric acids, while heating at about 70° C. The chlorine advantageously is bubbled into the reaction mixture at a slow rate over a period of from 1½ to 2 hours while the temperature is maintained at about 70° C. thus forming the corresponding 2-nitrobenzenesulfonyl chloride which then is reacted with at least two molar equivalents of ammonia or an amine advantageously over a period of from 30 to 60 minutes while maintaining the reaction mixture cool, preferably in an ice bath. Subsequently, the reaction mixture is heated to between 50–100° C. to form the corresponding 2-nitrobenzenesulfonamide (III). The nitro group is reduced to the amino group to form the desired sulfamylaniline compound, (IV), which can be cyclized and converted to the 7-sulfamylbenzothiadiazine-1,1-dioxide compound by the methods described above.

When $R^1$ is hydrogen, a lower alkyl, or an alkoxy group, the reduction of the nitro group advantageously can be effected by catalytic hydrogenation employing platinum or palladium. Platinum oxide has been found to be particularly suitable for this reduction, although other catalysts, such as platinum on a carrier, also can be used to advantage. When $R^1$ is a halogen, however, reduction is effected chemically preferably with iron powder in the presence of hydrochloric acid.

The novel methods of this invention will be illustrated by the following examples.

METHOD A

*Chlorosulfonation and amidation of a benzothiadiazine-1,1-dioxide*

EXAMPLE 1.—3,4-DIMETHYL-7-SULFAMYL-1,2,4-BENZOTHIADIAZINE-1,1-DIOXIDE

A solution of 10 g. of 3,4-dimethyl-1,2,4-benzothiadiazine-1,1-dioxide in 35 ml. of chlorosulfonic acid is heated in an oil bath at 140–160° C. for 4 hours, cooled and poured onto ice. The solid which is formed is collected on a filter, transferred to a beaker and treated with 25 ml. of 28% aqueous ammonium hydroxide at room temperature. A vigorous reaction ensues with complete solution of the solid. Within five minutes, the product separates and, after cooling in an ice bath, is collected on a filter, washed with water, and recrystallized from acetone-petroleum ether yielding 3,4-dimethyl-7-sulfamyl-1,2,4-benzothiadiazine-1,1-dioxide as colorless needles, M.P. 258–260° C.

*Analysis.*—Calculated for $C_9H_{11}N_3O_4S_2$: C. 37.36; H, 3.83; N, 14.52. Found: C, 37.43; H, 3.86; N, 14.50.

EXAMPLE 2.—7-SULFAMYL-1,2,4-BENZOTHIADIAZINE-1,1-DIOXIDE

By replacing the 3,4-dimethyl-1,2,4-benzothiadiazine-1,1-dioxide employed in Example 1 by an equimolecular quantity of 1,2,4-benzothiadiazine-1,1-dioxide and following substantially the same procedure described in Example 1, there is obtained 7-sulfamyl-1,2,4-benzothiadiazine-1,1-dioxide, M.P. 319–320° C.

EXAMPLE 3.—2-METHYL-7-SULFAMYL-1,2,4-BENZOTHIADIAZINE-1,1-DIOXIDE

*Step A.*—A mixture of 10 g. of o-aminobenzenesulfonmethylamide and 25 ml. of ethyl orthoformate is heated at 125–135° C. for 30 minutes. The solvent is removed by distillation in vacuo and the residue crystallized from alcohol yielding 2-methyl-1,2,4-benzothiadiazine-1,1-dioxide.

*Step B.*—The 2-methyl-1,2,4-benzothiadiazine-1,1-dioxide, obtained as described above, is treated with chlorosulfonic acid and heated on the steam bath for 2 hours, cooled, and poured onto ice forming 2-methyl-7-chlorosulfonyl-1,2,4-benzothiadiazine-1,1-dioxide. Treatment of this product with 28% ammonium hydroxide at room temperature yields 2-methyl-7-sulfamyl-1,2,4-benzothiadiazine-1,1-dioxide.

EXAMPLE 4.—6-AMINO-7-SULFAMYL-1,2,4-BENZOTHIADIAZINE-1,1-DIOXIDE

*Step A.*—By replacing the o-aminobenzenesulfonmethylamide employed in Step A of Example 3, by an equimolecular quantity of 5-nitro-2-sulfamylaniline and following substantially the same procedure described in Step A of Example 3, there is obtained 6-nitro-1,2,4-benzothiadiazine-1,1-dioxide.

*Step B.*—A solution of the thus obtained 6-nitro-1,2,4-benzothiadiazine-1,1-dioxide in 600 ml. of a 50% alcohol-water mixture is shaken in an atmosphere of hydrogen with 400 mg. of platinum oxide catalyst until hydrogen absorption ceases. The catalyst is removed by filtration and the solution concentrated to dryness in vacuo. Crystallization of the residue from a 50% alcohol-water mixture yields 6-amino-1,2,4-benzothiadiazine-1,1-dioxide.

*Step C.*—The thus obtained 6-amino-1,2,4-benzothiadiazine-1,1-dioxide is chlorosulfonated and amidated by substantially the same procedures described in Example 3, Step B, to give 6-amino-7-sulfamyl-1,2,4-benzothiadiazine-1,1-dioxide.

METHOD B

*Preparation of intermediate sulfamylaniline from 2-amino-benzenesulfonic acid, ring closure and subsequent chlorosulfonation of the benzothiadiazine-1,1-dioxide*

EXAMPLE 5.—6-CHLORO-7-SULFAMYL-1,2,4-BENZOTHIADIAZINE-1,1-DIOXIDE

*Step A.*—A mixture of 50 g. of 2-amino-4-chlorobenzenesulfonic acid and 300 ml. of thionyl chloride is heated for 3 hours, cooled, and the product collected on a filter, washed with benzene, yielding 5-chloroaniline-2-sulfonyl chloride. The product thus obtained is transferred to a beaker and treated with 200 ml. of 28% ammonium hydroxide. After heating on the steam bath for 1 hour, the mixture is cooled and the solid collected on the filter. Crystallization from alcohol-water yields 5-chloro-2-sulfamylaniline.

*Step B.*—The product thus obtained is treated with ethyl orthoformate by substantially the same method as described in Example 3, Step A, to form the 6-chloro-1,2,4-benzothiadiazine-1,1-dioxide which is chlorosulfonated yielding 6-chloro-7-chlorosulfonyl-1,2,4-benzothiadiazine-1,1-dioxide and then amidated by substantially the same methods described in Step B of Example 3 to form 6-chloro-7-sulfamyl-1,2,4-benzothiadiazine-1,1-dioxide, M.P. 342.5–343° C.

EXAMPLE 6.—6-CHLORO-2-METHYL-7-SULFAMYL-1,2,4-BENZOTHIADIAZINE-1,1-DIOXIDE

The 5-chloroaniline-2-sulfonyl chloride, obtained as described in Step A of Example 5, is treated with 100 ml. of 40% aqueous methylamine and heated on the steam bath for about 1 hour. The mixture then is cooled and the solid which forms is collected on the filter. Crystallization from alcohol-water yields 5-chloro-2-methylsulfamylaniline.

The product thus obtained then is heated with ethyl orthoformate as described in Step A of Example 3, to form the 5-chloro-2-methyl-1,2,4-benzothiadiazine-1,1-dioxide which then is treated with chlorosulfonic acid and then with ammonia by substantially the same procedures as described in Step B of Example 3 to form 6 - chloro - 2 - methyl - 7 - sulfamyl - 1,2,4 - benzothiadiazine-1,1-dioxide.

EXAMPLE 7.—6-CHLORO-3-METHYL-7-SULFAMYL-1,2,4-BENZOTHIADIAZINE-1,1-DIOXIDE

*Step A.*—A mixture of 25 g. of 2-amino-4-chlorobenzenesulfonic acid and 100 ml. of acetic anhydride is heated on the steam bath for 30 minutes and concentrated to dryness in vacuo. The residue is heated on the steam bath with 150 ml. of thionyl chloride for 3 hours, cooled, and the product collected on a filter, washed with cold benzene, transferred to a beaker and treated with 50 ml. of 28% ammonium hydroxide. After heating for 30 minutes on the steam bath, the mixture is cooled, collected on the filter, and recrystallized from alcohol-water to give 5-chloro-2-sulfamylacetanilide.

*Step B.*—By replacing the 2-amino-4-chlorobenzenesulfonic acid employed in Step A of Example 5 by the 5-chloro-2-sulfamylacetanilide obtained in Step A of this example, and following substantially the same procedures described in Steps A and B of Example 5, there is obtained 6 - chloro - 3 - methyl - 7 - sulfamyl - 1,2,4 - benzothiadiazine-1,1-dioxide.

EXAMPLE 8.—6-CHLORO-4-METHYL-7-SULFAMYL-1,2,4-BENZOTHIADIAZINE-1,1-DIOXIDE

*Step A.*—A solution of 34.4 g. (0.15 mole) of the sodium salt of 2-amino-4-chlorobenzenesulfonic acid in 60 ml. of water is cooled in an ice bath and to it is added 19.5 g. dimethylsulfate with vigorous stirring. The crystalline precipitate is collected in a filter and dried in vacuo yielding 4-chloro-2-methylaminobenzenesulfonic acid.

*Step B.*—A mixture of the above obtained 4-chloro-2-methylaminobenzenesulfonic acid and thionyl chloride is heated on the steam bath for about 3 hours. After cooling, the product obtained is collected on a filter, washed with benzene, transferred to a beaker and treated with 28% ammonium hydroxide. After heating on the steam bath for 1 hour, the mixture is cooled and the solid collected on the filter. Crystallization from alcohol-water yields 5-chloro-N-methyl-2-sulfamylaniline.

*Step C.*—The product thus obtained is treated with ethyl orthoformate by substantially the same method as described in Step A of Example 3 to form 6-chloro-4-methyl-1,2,4-benzothiadiazine-1,1-dioxide which is chlorosulfonated and then amidated by substantially the same process as described in Step B of Example 3 yielding 6-chloro - 4 - methyl - 7 - sulfamyl - 1,2,4 - benzothiadiazine-1,1-dioxide.

EXAMPLE 9.—6-CHLORO-3,4-DIMETHYL-7-SULFAMYL-1,2,4-BENZOTHIADIAZINE-1,1-DIOXIDE 4-chloro-2-methylaminobenzenesulfonic acid, 25 g., is substituted for the 2-amino-4-chlorobenzenesulfonic acid in the process described in Example 7, Step A, yielding 5 - chloro - 2 - sulfamyl - N - methylacetanilide. The product thus obtained is heated at 200° C. for 30 minutes to form 6-chloro-3,4-dimethyl-1,2,4-benzothiadiazine-1,1-dioxide.

By replacing the 3,4-dimethyl-1,2,4-benzothiadiazine-1,1-dioxide employed in Example 1 by an equimolecular quantity of the 6-chloro-3,4-dimethyl-1,2,4-benzothiadiazine-1,1-dioxide obtained as described above, and following substantially the same procedure described in Example 1, there is obtained 6-chloro-3,4-dimethyl-7-sulfamyl-1,2,4-benzothiadiazine-1,1-dioxide.

METHOD C

*Preparation of a sulfamylaniline from 2-chloronitrobenzene followed by ring closure and chlorosulfonation and amidation of the benzothiadiazine-1,1-dioxide*

EXAMPLE 10.—6-CHLORO-7-SULFAMYL-1,2,4-BENZOTHIADIAZINE-1,1-DIOXIDE

*Step A.*—To a solution of 360 g. (1.5 mole) of crystalline sodium sulfide in 1500 ml. of 90% ethanol, 48 g. (1.5 atoms) of finely ground sulphur is added and the mixture heated on the steam bath until the sulphur dissolves. The sodium disulfide solution thus obtained then is added dropwise to a solution of 384 g. (2.0 mole) of 2,5-dichloronitrobenzene in 650 ml. of 95% ethanol over a period of 1 to 2 hours. The mixture is heated on the steam bath for 2 to 3 hours and, after cooling in an ice bath, the crystalline precipitate is collected by suction filtration, transferred to a 1 liter beaker and stirred thoroughly with 500 ml. of water to remove the sodium chloride. The precipitate which forms is collected on the filter and washed with 100 ml. of alcohol and dried at 55° C. yielding di-(4-chloro-2-nitrophenyl) disulfide.

*Step B.*—A stream of chlorine is passed into a mixture of 245 g. (0.65 mole) of the thus obtained di-(4-chloro-2-nitrophenyl) disulfide, 1 liter of concentrated hydrochloric acid and 200 ml. concentrated nitric acid, at the rate of about 2 bubbles per second. The temperature is maintained at 70° C. by intermittent heating on the steam bath over a period of 1½ to 2 hours. The 5-chloronitrobenzene-2-sulfonyl chloride is separated from the supernatant liquid by decantation, washed with two 300 ml. portions of warm water and allowed to solidify, and the product then collected on the filter. The 5-chloronitrobenzene-2-sulfonyl chloride thus obtained is added portionwise to 500 ml. of 28% ammonia hydroxide and cooled in an ice bath over a period of 30 minutes. The mixture then is heated for 2 hours on the steam bath, cooled, and the product collected on the filter. Recrystallization from aqueous alcohol yields 5-chloro-2-sulfamylnitrobenzene.

*Step C.*—A suspension of 28.4 g. (0.12 mole) of the thus obtained 5-chloro-2-sulfamylnitrobenzene in a mixture of 50 ml. of methanol and 95 ml. of water containing 4 g. of cupric chloride is heated on the steam bath to 70° C. Six additions, each consisting of 5 g. of iron powder followed by 20 ml. of concentrated hydrochloric acid, are made over a period of 3½ hours. The temperature is maintained between 70 and 80° C. After final addition of iron powder and concentrated hydrochloric acid, the mixture is heated between 80–85° C. for 1 to 2 hours and then cooled to room temperature and filtered. The filtrate is cooled in an ice bath and neutralized with aqueous sodium hydroxide to give 5-chloro-2-sulfamylaniline.

*Step D.*—The 5-chloro-2-sulfamylaniline is treated with ethyl orthoformate and heated by substantially the same method as described in Example 3, Step A to yield 6-chloro-1,2,4-benzothiadiazine-1,1-dioxide which is chlorosulfonated and then amidated by substantially the same method as described in Example 3, Step B, to form 6-chloro-7-sulfamyl-1,2,4-benzothiadiazine-1,1-dioxide.

EXAMPLE 11.—6-PROPYL-7-SULFAMYL-1,2,4-BENZOTHIADIAZINE-1,1-DIOXIDE

*Step A.*—By replacing the 2,5-dichloronitrobenzene employed in Example 10, Step A, by an equimolecular quantity of 2-chloro-5-propylnitrobenzene and following substantially the same procedures described in Example 10, Steps A and B, there is obtained 5-propyl-2-sulfamylnitrobenzene.

*Step B.*—A solution of 5 g. of the thus obtained 5-propyl-2-sulfamylnitrobenzene in 500 ml. of a 50% alcohol-water mixture is shaken in an atmosphere of hydrogen with 400 mg. of platinum oxide catalyst until hydrogen absorption ceases. The catalyst is removed by filtration and the solution concentrated to dryness in vacuo. Crystallization of the residue from a 50% alcohol-water mixture yields 5-propyl-2-sulfamylaniline.

*Step C.*—The thus obtained 5-propyl-2-sulfamylaniline is treated with ethyl orthoformate and then heated by substantially the same process described in Example 3, Step A, to form the 6-propyl-1,2,4-benzothiadiazine-1,1-dioxide which then is chlorosulfonated and then amidated by substantially the same process described in Example 3, Step B, to form 6-propyl-7-sulfamyl-1,2,4-benzothiadiazine-1,1-dioxide.

EXAMPLE 12.—6-BUTOXY-7-SULFAMYL-1,2,4-BENZOTHIADIAZINE-1,1-DIOXIDE

By replacing the 2-chloro-5-propylnitrobenzene employed in Step A of Example 11 by an equimolecular quantity of 2-chloro-5-butoxynitrobenzene and following substantially the same procedure described in Steps A through C of Example 11, there is obtained 6-butoxy-7-sulfamyl-1,2,4-benzothiadiazine-1,1-dioxide.

EXAMPLE 13.—6-CHLORO-4-METHYL-3-PROPYL-7-SULFAMYL-1,2,4-BENZOTHIADIAZINE-1,1-DIOXIDE

A mixture of 25 g. of 4-chloro-2-methylaminobenzenesulfonic acid and 100 ml. of butyryl chloride is heated on the steam bath for 30 minutes and then concentrated to dryness in vacuo. The residue is heated on the steam bath with 150 ml. of thionyl chloride for 3 hours, cooled, and the product collected on a filter, washed with cold benzene, transferred to a beaker and treated with 50 ml. of 28% ammonium hydroxide. After heating for 30 minutes on the steam bath, the mixture is cooled, collected on the filter, and recrystallized from alcohol-water yielding N,N-butyrylmethyl-5-chloro-2-sulfamylaniline.

By replacing the 2-amino-4-chlorobenzenesulfonic acid employed in Example 5 by the compound obtained as described above, and following substantially the same procedures described in Steps A and B of Example 5, there is obtained 6-chloro-4-methyl-3-propyl-7-sulfamyl-1,2,4-benzothiadiazine-1,1-dioxide.

EXAMPLE 14.—4,6-DIMETHYL-7-SULFAMYL-1,2,4-BENZOTHIADIAZINE-1,1-DIOXIDE

By replacing the sodium salt of 2-amino-4-chlorobenzenesulfonic acid employed in Example 8 by an equivalent quantity of the sodium salt of 2-amino-4-methylbenzenesulfonic acid and following substantially the same procedures described in Steps A through C of Example 8, there is obtained 4,6-dimethyl-7-sulfamyl-1,2,4-benzothiadiazine-1,1-dioxide.

EXAMPLE 15.—6-CHLORO-7-N-n-BUTYLSULFAMYL-1,2,4-BENZOTHIADIAZINE-1,1-DIOXIDE 6-chloro-7-chlorosulfonyl-1,2,4-benzothiadiazine-1,1-dioxide, obtained as described in Step B of Example 5 (9.4 g., 0.03 mole), is added portionwise to 50 ml. of 25% aqueous n-butylamine. After heating on the steam bath for 1 hour, the reaction mixture is cooled and the solid collected on the filter. Recrystallization from aqueous alcohol yields 6-chloro-7-N-n-butylsulfamyl-1,2,4-benzothiadiazine-1,1-dioxide.

EXAMPLE 16.—6-CHLORO-7-N,N-DIMETHYLSULFAMYL-1,2,4-BENZOTHIADIAZINE-1,1-DIOXIDE 6-chloro-7-chlorosulfonyl-1,2,4-benzothiadiazine-1,1-dioxide, obtained as described in Step B of Example 5 (9.4 g., 0.03 mole), is added portionwise to 50 ml. of 25% aqueous dimethylamine. After heating on the steam bath for 1 hour, the reaction mixture is cooled and the solid collected on the filter. Recrystallization from aqueous alcohol yields 6-chloro-7-N,N-dimethylsulfamyl-1,2,4-benzothiadiazine-1,1-dioxide.

EXAMPLE 17.—6-CHLORO-7-(1-PIPERIDYLSULFONYL)-1,2,4-BENZOTHIADIAZINE-1,1-DIOXIDE 6-chloro-7-chlorosulfonyl-1,2,4-benzothiadiazine-1,1-dioxide, obtained as described in Step B of Example 5 (9.4 g., 0.03 mole) is added portionwise to 25 ml. of piperidine. After heating on the steam bath for 1 hour, the reaction mixture is cooled and the solid collected on the filter. Recrystallization from aqueous alcohol yields 6-chloro-7-(1-piperidylsulfonyl)-1,2,4-benzothiadiazine-1,1-dioxide.

EXAMPLE 18.—6-CHLORO-7-(1-PYRROLIDYLSULFONYL)-1,2,4-BENZOTHIADIAZINE-1,1-DIOXIDE 6-chloro-7-chlorosulfonyl-1,2,4-benzothiadiazine-1,1-dioxide, obtained as described in Step B of Example 5 (9.4 g., 0.3 mole), is added portionwise to 25 ml. of pyrrolidine. After heating on the steam bath for 1 hour, the reaction mixture is cooled and the solid collected on the filter. Recrystallization from aqueous alcohol yields 6-chloro-7-(1-pyrrolidylsulfonyl)-1,2,4-benzothiadiazine-1,1-dioxide.

EXAMPLE 19.—6-CHLORO-7-(4-MORPHOLINYLSULFONYL)-1,2,4-BENZOTHIADIAZINE-1,1-DIOXIDE 6-chloro-7-chlorosulfonyl-1,2,4-benzothiadiazine-1,1-dioxide, obtained as described in Step B of Example 5 (9.4 g., 0.03 mole), is added portionwise to 25 ml. of morpholine. After heating on the steam bath for 1 hour, the reaction mixture is cooled and the solid collected on the filter. Recrystallization from aqueous alcohol yields 6-chloro-7-(4-morpholinylsulfonyl)-1,2,4-benzothiadiazine-1,1-dioxide.

EXAMPLE 20.—6-CHLORO-7-SULFAMYL-3-UNDECYL-1,2,4-BENZOTHIADIAZINE-1,1-DIOXIDE

By replacing the acetic anhydride employed in Example 7, Step A, by an equal quantity of lauroyl chloride, and following substantially the same procedures described in Steps A and B of Example 7, there is obtained 6-chloro-7-sulfamyl-3-undecyl-1,2,4-benzothiadiazine-1,1-dioxide.

While the above examples illustrate specific conditions for the introduction of a sulfamyl group into the 7-position of a benzothiadiazine-1,1-dioxide nucleus, and certain specific conditions for the preparation of the benzothiadiazine-1,1-dioxide starting materials, it is to be understood that slight modifications can be made in the reaction conditions described in the examples without departing from the scope of this invention as defined in the appended claims.

What is claimed is:

1. A process for preparing a 7-sulfamyl-1,2,4-benzothiadiazine-1,1-dioxide compound comprising heating at a temperature ranging between 100 to 165° C. a reaction mixture comprising an excess of a molar equivalent of chlorosulfonic acid and a benzothiadiazine-1,1-dioxide compound having one of the general structures

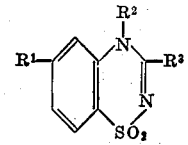

and

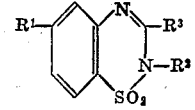

wherein $R^1$ is selected from the group consisting of hydrogen, halogen, lower alkyl, lower alkoxy and a nitro group; and $R^2$ and $R^3$ respectively is selected from the group consisting of hydrogen, and a lower alkyl radical; to form the 7-sulfonyl chloride derivative which then is reacted at a temperature ranging between room temperature and steam bath temperature with at least two molar equivalents of a compound selected from the group consisting of ammonia, a mono-lower alkylamine, a di-lower alkylamine, piperidine, pyrrolidine and morpholine to form a 7-sulfamylbenzothiadiazine-1,1-dioxide having one of the general structures

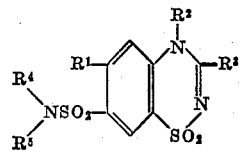

and

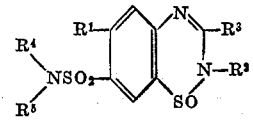

wherein $R^1$, $R^2$, and $R^3$ have the meaning assigned to each of them above and

is selected from the group consisting of the amino radical, a mono-lower alkylamino, a di-lower alkylamino, the 1-piperidyl, the 1-pyrrolidyl and the 4-morpholinyl radical.

2. A process as claimed in claim 1, wherein an excess of a molar equivalent of chlorosulfonic acid is heated with a 6-halo-1,2,4-benzothiadiazine-1,1-dioxide compound to form the 7-sulfonyl chloride derivative which then is reacted with at least two molar equivalents of ammonia to form a 6-halo-7-sulfamyl-1,2,4-benzothiadiazine-1,1-dioxide.

3. A process as claimed in claim 1, wherein an excess of a molar equivalent of chlorosulfonic acid is heated with 6-chloro-1,2,4-benzothiadiazine-1,1-dioxide to form the 7-sulfonyl chloride derivative which then is reacted with at least two molar equivalents of ammonia to form 6 - chloro - 7 - sulfamyl - 1,2,4 - benzothiadiazine -1,1 - dioxide.

4. A process as claimed in claim 1, wherein the benzothiadiazine-1,1-dioxide starting material is prepared by heating between about 50–100° C. a mixture of two molar equivalents of a 5-$R^1$-2-chloronitrobenzene, wherein $R^1$ is selected from the group consisting of hydrogen, halogen, lower alkyl, and a lower alkoxy group, and at least a molar equivalent of sodium disulfide to form the di-(2-nitrophenyl)disulfide which then is oxidized to the corresponding 2-nitrobenzenesulfonyl chloride and then amidated with at least two molar equivalents of a compound selected from the group consisting of ammonia and an amine and thereafter heating between about 50–100° C. the reaction mixture to form the corresponding 2-nitrobenzenesulfonamide, reducing the 2-nitro to the 2-amino group and cyclizing the product thus obtained by heating with a compound selected from the group consisting of formic acid and ethyl orthoformate to form the desired benzothiadiazine-1,1-dioxide.

References Cited in the file of this patent

UNITED STATES PATENTS 2,440,117    Popkin  ---------------- Apr. 20, 1948